(No Model.)

F. A. HOVEY.
COFFEE POT.

No. 404,707. Patented June 4, 1889.

Witnesses.
Henry G. Dieterich

Inventor.
Frank A. Hovey,
By his Attorneys

UNITED STATES PATENT OFFICE.

FRANK AUGUSTIN HOVEY, OF FARMINGTON FALLS, ASSIGNOR OF ONE-HALF TO HERBERT ELWELL, OF EAST WILTON, MAINE.

COFFEE-POT.

SPECIFICATION forming part of Letters Patent No. 404,707, dated June 4, 1889.

Application filed February 28, 1889. Serial No. 301,525. (No model.)

*To all whom it may concern:*

Be it known that I, FRANK AUGUSTIN HOVEY, a citizen of the United States, residing at Farmington Falls, in the county of Franklin and State of Maine, have invented new and useful Improvements in Coffee-Pots, of which the following is a specification.

The invention relates to improvements in coffee-pots; and it consists in certain novel construction and combination of devices fully described hereinafter in connection with the accompanying drawings, and specifically pointed out in the appended claims.

Figure 1:
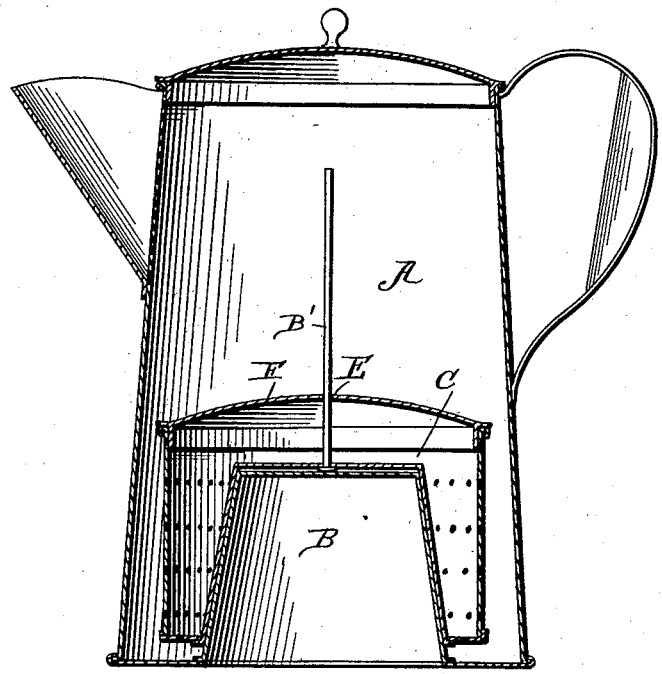
Figure 2:
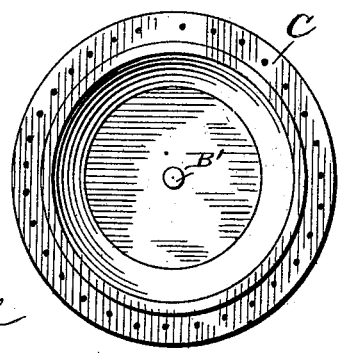

In the drawings, Figure 1 is a vertical central sectional view of a pot embodying my improvements. Fig. 2 is a bottom plan view of the receiver.

Referring by letter to the drawings, A designates the coffee-pot, which is provided with a concave bottom, forming a trunco-conical chamber B beneath the bottom of the pot, and C designates the receiver for the coffee, which is also provided with a concave bottom to fit over the concave bottom of the pot. The sides of the receiver fit down around the sides of the chamber B, and between the latter and the sides of the receiver are perforated, as shown in the drawings, to permit the water which is placed in the pot to pass into the interior of the receiver and act upon the coffee therein. A vertical rod or handle B' is affixed at its lower end to the center of the concave bottom of the receiver and passes up through a central opening E in the cover F of the receiver to enable the receiver to be removed from and placed in the pot.

The concave bottom of the receiver fits on the concave bottom of the pot, so that the former is supported firmly and steadily in the pot above the flat portion $a$ of the latter. Thus more surface is exposed to the heat, and the bottom of the pot extends up through the center of the water therein, and thereby enables the water to be more readily heated than when a flat bottom is used.

Having thus described the invention I claim—

1. The pot A, having the imperforate truncated-cone-shaped concavity B, in combination with the perforated receiving-cylinder having its bottom concaved to fit the bottom B, substantially as specified.

2. The combination of the coffee-pot provided with a concave bottom, the perforated receiver provided with a concave bottom fitting around the concave bottom of the pot, the lid on the receiver, and the vertical rod or handle affixed at its lower end to the center of the bottom of the receiver and passing through a central opening in the lid thereof, substantially as and for the purpose specified.

In testimony that I claim the foregoing as my own I have hereto affixed my signature in presence of two witnesses.

FRANK AUGUSTIN HOVEY.

Witnesses:
JOHN G. BROWN,
JOSIAH H. THOMPSON.